United States Patent
Chen et al.

(10) Patent No.: US 10,721,013 B2
(45) Date of Patent: Jul. 21, 2020

(54) METHOD AND APPARATUS FOR INFORMATION TRANSMISSION

(71) Applicant: ZTE CORPORATION, Guangdong (CN)

(72) Inventors: Xianming Chen, Guangdong (CN); Bo Dai, Guangdong (CN); Huiying Fang, Guangdong (CN); Shuqiang Xia, Guangdong (CN); Jing Shi, Guangdong (CN); Kun Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/065,973

(22) PCT Filed: Sep. 23, 2016

(86) PCT No.: PCT/CN2016/099944
§ 371 (c)(1),
(2) Date: Jun. 25, 2018

(87) PCT Pub. No.: WO2017/113901
PCT Pub. Date: Jul. 6, 2017

(65) Prior Publication Data
US 2019/0013897 A1    Jan. 10, 2019

(30) Foreign Application Priority Data
Dec. 28, 2015 (CN) .......................... 2015 1 1003579

(51) Int. Cl.
*H04L 1/00* (2006.01)
*H04W 72/04* (2009.01)
(Continued)

(52) U.S. Cl.
CPC .............. *H04L 1/0006* (2013.01); *H04L 1/00* (2013.01); *H04L 1/0042* (2013.01); *H04L 1/0072* (2013.01); *H04W 72/0446* (2013.01)

(58) Field of Classification Search
CPC ....... H04L 1/0006; H04L 1/00; H04L 1/0042; H04L 1/0072; H04W 72/0446
(Continued)

(56) References Cited

U.S. PATENT DOCUMENTS

2014/0098761 A1*  4/2014  Lee ..................... H04W 74/006
                                                                370/329
2015/0358996 A1   12/2015  Fang et al.
(Continued)

FOREIGN PATENT DOCUMENTS

CN     103929779 A    7/2014
EP     2892254 A1    7/2015
(Continued)

OTHER PUBLICATIONS

Extended European Search Report dated Nov. 23, 2018, in corresponding European Application No. 16880694.1.
(Continued)

*Primary Examiner* — Yemane Mesfin
*Assistant Examiner* — Intekhaab A Siddiquee
(74) *Attorney, Agent, or Firm* — Duane Morris LLP (57) ABSTRACT

Embodiments of the present disclosure provide a method and apparatus for information transmission, which comprises configuring a transmission window within a scheduling window; wherein, a scheduling window comprises K transmission windows, a transmission window comprises P available subframes, K is an integer greater than 0, P is an integer greater than 1, and the available subframes within the transmission window are utilized to transmit data. By using at least two subframes within a transmission window to
(Continued)

transmit data, the technical solutions provided by the present embodiments allow for the channel coding and rate matching of system information, such as SIB1 information, to no longer be restricted to within a single subframe; this technology is especially applicable to system information transmission in systems like NB-IoT, and ensures transmission performance of system information like NB-IoT SIB1 information.

13 Claims, 4 Drawing Sheets

(51) Int. Cl.
*H04L 5/14* (2006.01)
*H04L 1/22* (2006.01)
*H04L 1/16* (2006.01)

(58) Field of Classification Search
USPC ........................................................ 370/329
See application file for complete search history.

(56) References Cited

U.S. PATENT DOCUMENTS

2017/0180095 A1* 6/2017 Xue ...................... H04L 5/0048
2018/0212726 A1* 7/2018 Xue ........................ H04L 27/26

FOREIGN PATENT DOCUMENTS

WO 2015/041487 A1 3/2015
WO 2015/066645 A1 5/2015

OTHER PUBLICATIONS

Ericsson et al, "NB LTE-Concept Description L1", 3GPP TSG-RAN #69, Sep. 14-16, 2015, Phoenix, Arizona, RP-151397, 24 pages.
International Search Report dated Dec. 22, 2016, in corresponding International Application No. PCT/ CN2016/099944.

* cited by examiner

METHOD AND APPARATUS FOR INFORMATION TRANSMISSION

TECHNICAL FIELD

The present embodiments relate to Cellular Internet of Things (C-IoT) technology, specifically to a method and apparatus for the transmission of information.

BACKGROUND TECHNIQUES

In order to meet the requirements of C-IoT, a new access system for the Narrowband-Cellular Internet of Things (NB-IoT) was presented at the 69th plenary session of the 3rd Generation Partnership Project (3GPP); the research field pays particular attention to the low-complexity, low-throughput radio frequency (RF) technology of NB-IoT, with primary research aims comprising: improved indoor coverage, a high volume of low-throughput user equipment (UE) support, low latency sensitivity, extremely low equipment cost, low device power loss, and network architecture. The uplink and downlink transmission bandwidth for the NB-IoT system is 180 kHz, the same bandwidth as a physical resource block (PRB) in the Long-Term Evolution (LTE) system, which facilitates the reuse of design related to the existing LTE system. In addition, the NB-IoT system technology supports three different operating modes: 1) Stand-alone operation, such as the frequency spectrum used by GSM evolved radio access network systems with enhanced data rates (GERAN, GSM EDGE Radio Access Network) to replace one or multiple GSM carriers; 2) Guard band operation, such as the use of unused resource blocks (RB) within an LTE carrier guard band; 3) In-band operation, such as using an RB within the normal range of an LTE carrier.

Within the LTE system, the first system information broadcast (SIB1) message is used to carry necessary system information, wherein, SIB1 messages are transmitted in subframe 5 of every even-numbered radio frame, and related channel coding or rate matching processes rely on a single subframe (i.e., a PRB allocated to each SIB1 message in every 5th subframe). In the existing LTE system, a PRB that is allocated to SIB1 messages can dynamically regulate based on SIB1's transport block size (TBS), and thus can obtain the appropriate coding rate; as a result, channel coding or rate matching based on single subframes is possible.

But because the bandwidth of the NB-IoT system is only 180 kHz—only equal to the size of 1 PRB in the LTE system—the greatest number of PRB able to be allocated to NB-IoT SIB1 messages is 1. As a result, it is not possible to dynamically regulate the number of PRB allocated based on the TBS of the NB-IoT SIb1 message with existing SIB1 transmission methods within the LTE system. Under these circumstances, the transmission performance of NB-IoT SIB1 messages will be undoubtedly and severely limited when the TBS of the NB-IoT SIB1 message exceeds a certain threshold if it is still based on channel coding or rate matching of a single subframe.

CONTENTS OF THE PRESENT EMBODIMENTS

Contents of the present embodiments provide a method and apparatus for the transmission of information suitable for information transmission in the NB-IoT system that ensure the transmission performance of system information.

In order to achieve the aims of the present invention, the present embodiments provide a method for the transmission of information, which comprises: configuring a transmission window within a scheduling window; wherein, a scheduling window comprises K transmission windows, a transmission window comprises P available subframes, K is an integer greater than 0, and P is an integer greater than 1; utilizing available subframes in the transmission window to transmit information.

Alternatively, a scheduling window comprises: N1 physical broadcast channel (PBCH) scheduling cycles; or, N2 PBCH sub-block cycles; a transmission window comprises: ½ PBCH sub-block cycles or M PBCH sub-block cycles; or, P available subframes that are cross continuous; wherein, N1, N2, and M are all integers greater than 0; every PBCH scheduling window comprises at least one PBCH sub-block cycle.

Alternatively, the utilization of available subframes in the transmission window to transmit information comprises: obtaining, within K transmission windows, L transmission windows used for information transmission; for any transmission window within L transmission windows, Q available subframes within the transmission window are obtained, and information is transmitted on the acquired Q available subframes; wherein, L is an integer greater than 0 and lesser than or equal to K, and Q is an integer greater than 1.

Alternatively, any of the available subframes belongs to a set of remaining subframes other than the subframes of the transmission of the primary synchronization signal/secondary synchronization signal (PSS/SSS) and PBCH subframes in the specified set of subframes.

Alternatively, the specified subframe set for the frequency duplex division (FDD) system is a set of all subframes comprising subframes numbered 0, 4, 5, and 9; the specified subframe set for the time duplex (TDD) system is a set of all subframes comprising subframes numbered 0, 1, 5, and 6; or, a set of all subframes comprising subframes numbered 1 and 6.

Alternatively, the transmission of information on the acquired Q available subframes comprises: obtaining the channel coded data of aforementioned information based on the number of Q available subframes for information transmission in the transmission window, or on the number of Q available subframes for information transmission in the transmission window and the transmission window sequence number; the obtained channel coded data is then mapped to Q available subframes and transmitted.

Alternatively, obtaining the channel coded data of aforementioned information based on the Q available subframes for information transmission within the transmission window and the transmission window sequence number comprises: obtaining the quantity of channel coded data according to the Q available subframes for information transmission within the transmission window, and obtaining the redundancy version (RV) of the channel coded data based on the transmission window sequence number.

Alternatively, the obtainment of L transmission windows for information transmission comprises: predefining or signaling to indicate the number of L transmission windows for information transmission; predefining or signaling to indicate the position of L transmission windows for information transmission, or determining the position of L transmission windows according to the physical cell identification (PCID).

Alternatively, obtaining, within the transmission window, Q available subframes for information transmission comprises: predefining or signaling to indicate the number of Q available subframes within the transmission window; predefining or signaling to indicate the position of Q available subframes within the transmission window, or determining the position of Q available subframes within the transmission window according to the PCID and/or the transmission window sequence number.

Alternatively, when the number of L transmission windows and/or the number of Q available subframes within the transmission window is instructed by signaling, aforementioned instruction method comprises: joint coding of the number of L transmission windows for information transmission and the transfer block size (TBS); or, joint coding of the number of Q available subframes and the TBS; or, joint coding of the number of L transmission windows for information transmission and the number of Q available subframes within the transmission window; or, joint coding of the number of L transmission windows, the number of Q available subframes within the transmission window, and the TBS of the system information.

Alternatively, L transmission windows used within K transmission windows to transmit information are continuous or non-continuous L transmission windows, and Q available subframes used to transmit information within transmission windows are continuous or non-continuous Q subframes.

Alternatively, aforementioned method comprises: predefining or signaling to indicate the size of the transmission window and/or the size of the scheduling window.

Alternatively, when the transmission window is a cross-continuous P subframe, P is equal to Q.

Alternatively, candidate positions for L transmission windows comprise floor(K/L); the L transmission window corresponding to the jth candidate position is: a continuous L transmission window beginning from the transmission window sequence numbered L·(j−1); or, a non-continuous L transmission window beginning from the transmission window sequence numbered (j−1) and with an adjacent transmission window interval of floor(K/L); wherein, j is an integer greater than or equal to 1 and lesser than or equal to floor(K/L), and "floor" indicates that the integer operation is rounded downward.

Alternatively, determining the position of the L transmission windows used for information transmission according to the PCID comprises: classifying all PCID into Type-X according to pre-established rules, wherein, X is an integer greater than 0 and indicates the number of candidate positions of the L transmission windows used for information transmission within the scheduling window; setting the type-X PCID to correspond to the X candidate positions of the L transmission windows with a one-to-one ratio.

Alternatively, aforementioned pre-established rules comprise: assigning PCID with equivalent expression values for the following expressions: mod(PCID, X); or, mod(floor (PCID/Y), X) to the same category; wherein, "mod" indicates that the operation takes the remainder, "floor" indicates that the integer operation is rounded downward, Y is an integer greater than 0 and indicates that the number of candidate positions of Q available subframes for information transmission within a transmission window.

Alternatively, candidate positions for Q available subframes for information transmission within a transmission window comprise floor(P/Q); the Q available subframe corresponding to the jth candidate position is: a continuous Q available subframe beginning from the available subframe numbered Q·(j−1), or, a non-continuous Q available subframe beginning from the available subframe numbered (j−1) and with an adjacent available subframe interval of floor(P/Q); wherein, j is an integer greater than or equal to 1 and lesser than or equal to floor(P/Q), and "floor" indicates that the integer operation is rounded downward.

Alternatively, when the position of the Q available subframes for information transmission within the transmission window is determined by PCID and/or the transmission window sequence number, aforementioned determination comprises: assigning all PCID to type-Y according to the 1st preset rule, wherein, Y is an integer greater than 0 and indicates the number of candidate positions of Q available subframes for information transmission within the transmission window; setting type-Y PCID to correspond to the Y candidate positions of Q available subframes for information transmission with a one-to-one ratio; or, assigning all transmission window sequence numbers to type-Y according to the 2nd preset rule, and setting type-Y transmission window sequence numbers to correspond to Y candidate positions of Q available subframes for information transmission with a one-to-one ratio; or, combining all PCID and transmission window sequence numbers and assigning to type-Y according to the 3rd preset rule; setting type-Y transmission window sequence numbers to correspond to Y candidate positions of Q available subframes for information transmission using a one-to-one ratio.

Alternatively, the 1st preset rule comprises: assigning PCID with equivalent expression values for the following expressions: mod(PCID, Y); or, mod(floor(PCID/X), Y) to the same category; the 2nd preset rule comprises: assigning duplicate window sequence numbers with equivalent expression values for the following expression: mod(NTW, Y) to the same category; the 3rd preset rule comprises: assigning groups of PCID and duplicate window sequence numbers with equivalent expression values for the following expressions: mod(PCID+NTW, Y); or, (floor(PCID/X)+ NTW,Y) to the same categories; wherein, "mod" indicates that the operation takes the remainder, "floor" indicates that the integer operation is rounded downward, NTW represents the duplicate window sequence number, and X is an integer greater than 0 that indicates the number of candidate positions of the L duplicate windows that transmit information in the transmission window.

Alternatively, signaling is used to indicate at least one of the following: radio frame number, super-frame number, operating mode, reference signal (RS) sequence configuration, RS port number configuration, the frequency offset between different physical channels, base station uplink access capability and downlink control channel configuration; wherein, base station uplink access capability is used to indicate whether or not the base station can support the uplink access mode and corresponding carrier bandwidth based on single carrier and/or multiple carrier use.

Alternatively, operating mode and RS sequence configuration are jointly coded.

Alternatively, for In-band operation, when the content of signaling or information comprises RS port number configuration, a physical downlink channel carrying the RS port number configuration and a physical downlink channel received before receiving a physical downlink channel carrying the RS port number configuration are both resource-mapped based on a 4-port RS; after receiving the physical downlink channel carrying the RS port number configuration, the physical downlink channel implements resource-mapping according to the RS of the RS port number indicated by the RS port number configuration; when the content of signaling instructions or the content of information does not comprise the RS port number configuration, all physical downlink channels implement resource-mapping based on a 4-port RS.

Alternatively, when the content of signaling instructions comprises RS sequence configuration, RS sequence configuration comprises one of the following: the index of the physical resource block (PRB) used as the NB-IoT narrowband; the frequency offset of the NB-IoT narrowband related to the LTE system bandwidth center frequency.

Alternatively, the contents of the information comprise all of the configuration parameters related to the initial access.

Alternatively, with non-In-band operation, information occupies all of the orthogonal frequency-division multiplexed (OFDM) symbol resources within the subframe; and/or, the size of the scheduling window does not exceed the size of scheduling window used with In-band operation, and the size of the transmission window does not exceed the size of the transmission window used with In-band operation.

Alternatively, information comprises, but is not limited to, NB-IoT SIB1 messaging and Paging messaging.

Alternatively, signaling comprises PBCH signaling.

Alternatively, with non-in-band operation, the first 3 OFDM symbols of the transmission of the primary synchronization signal/secondary synchronization signal (PSS/SSS) subframe are transmitted on the PBCH.

The present embodiments also provide an apparatus for the transmission of information, which comprises a configuration module and a processing module; wherein, a configuration module is configured to set up the transmission window within the scheduling window; wherein, a scheduling window comprises K transmission windows, a transmission window comprises P available subframes, K is an integer greater than 0, and P is an integer greater than 1; a processing module is configured to utilize available subframes in the transmission window to transmit information.

Alternatively, a scheduling window comprises: N1 PBCH scheduling cycles; or comprises N2 PBCH sub-block cycles; a transmission window comprises: ½ PBCH sub-block cycles or M PBCH sub-block cycles; or, P available subframes that are cross continuous; wherein, N1, N2, and M are all integers greater than 0; every PBCH scheduling cycle comprises at least one PBCH sub-block cycle.

Alternatively, the processing module is configured as follows: L transmission windows used to transmit information are obtained within K transmission windows; Q available subframes are acquired within any transmission window in an L transmission window, and information is transmitted on aforementioned acquired Q available subframe; wherein, L is an integer greater than 0 and less than or equal to K, and Q is an integer greater than 1.

Alternatively, the method for information transmission on acquired Q available subframes comprises: obtaining channel coded data of aforementioned information based on the number of Q available subframes for information transmission within the transmission window or based on the number of Q available subframes for information transmission within the transmission window and the transmission window sequence number; mapping the acquired channel coding information of aforementioned information onto Q available subframes and transmitting.

The present embodiments also provide a computer storage medium, wherein, aforementioned computer storage medium stores execution instructions, wherein, aforementioned execution instructions are used to implement the information transmission methods listed above and in the present embodiments.

Compared with existing technologies, the technical solutions provided in the present application comprise: configuring a transmission window within a scheduling window; wherein, a scheduling window comprises K transmission windows, a transmission window comprises P available subframes, K is an integer greater than 0, and P is an integer greater than 1; utilizing available subframes within the transmission window to transmit information. The technical solutions of the present embodiments provide a method wherein at least two subframes are used within a transmission window to transmit information; this method allows for channel coding or rate matching for system information such as SIB1 messages to no longer be limited to a single subframe, is suitable for the transmission of system information on NB-IoT systems, and ensures the transmission performance of system information such as NB-IoT SIB1 messaging.

The features and advantages of the present embodiments are set forth in the following specifications and will, in part, become apparent from the description, or will be understood by their implementation. The aims and other advantages of the present embodiments can be implemented and attained using the structure specially pointed out in the claims, specifications, and accompanying figures.

BRIEF DESCRIPTION OF THE DRAWING

The drawings described herein are provided in the interest of deepening the understanding of the present embodiments, and constitute one part of this application. The present invention's illustrative embodiments and the explanations thereof are provided to further explain the present invention, and do not serve to limit it. The drawings.

DETAILED DESCRIPTION

In order for the technical solutions and advantages of the present embodiments to become more apparent, this document will hereinafter reference the drawings and describe examples of the present embodiments in detail. It should be noted that the embodiments of the present disclosure and the features thereof can be combined in a non-conflicting manner.

Figure 1:
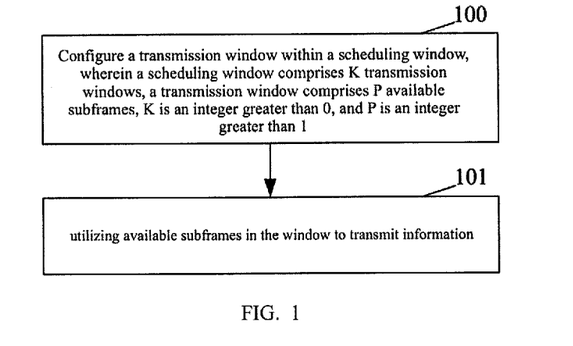
FIG. 1 is a flowchart describing the information transmission method of the present embodiments.

FIG. 1 is a flowchart describing the information transmission method of the present embodiments, which comprises:

Step 100: configuring a transmission window within a scheduling window; wherein, a scheduling window comprises K transmission windows, a transmission window comprises P subframes, K is an integer greater than 0, and P is an integer greater than 1.

Wherein, the scheduling window can also be called the scheduling cycle, the transmission window can also be called the duplicate cycle or the duplicate transmission interval; the transmission of information within a transmission window that is within a scheduling window is to be regarded as a transmission within aforementioned scheduling window; the maximum number of K transmission windows that comprise a scheduling window is equal to the greatest number of repeat transmissions supported by the scheduling window.

It should be noted that a transmission window comprises P available subframes, which does not indicate that a transmission window is comprised only of P subframes; in other words, the number of subframes within a transmission window could greatly exceed P, but the only available subframes within a transmission window that are able to transmit information are P available subframes.

Wherein, any one of the available subframes belongs to a set of remaining subframes other than the subframes of the transmission of the primary synchronization signal/secondary synchronization signal (PSS/SSS) and PBCH subframes in the specified set of subframes. In particular, the specified subframe set for the frequency duplex division (FDD) system is a set of all subframes comprising subframes numbered 0, 4, 5, and 9; the specified subframe set for the time duplex (TDD) system is a subframe set of all subframes comprising subframes numbered 0, 1, 5, and 6; or, a subframe set composed of all subframes comprising subframes numbered 1 and 6.

The aforementioned method prevents PSS/SSS and PBCH transmission from colliding with information transmission.

Figure 2:
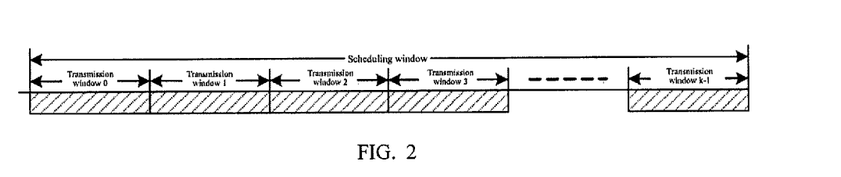
FIG. 2 is a schematic diagram defining the transmission window of the present embodiments.

FIG. 2 is a schematic diagram defining the transmission window of the present embodiments. As is shown in FIG. 2, within the range of a scheduling window are defined K transmission windows, wherein, K is an integer greater than 0; in addition, there is no overlap among different scheduling windows.

Wherein, a scheduling window comprises N1 physical broadcast channel (PBCH) scheduling cycles, or comprises N2 PBCH sub-block cycles; a transmission window comprises ½ PBCH sub-block cycles or M PBCH sub-block cycles; or, P available subframes that are cross continuous. Wherein, N1, N2, and M are all integers greater than 0; wherein, every PBCH scheduling window comprises at least one PBCH sub-block cycle (e.g., 8 cycles).

In the case where a transmission window is cross-continuous P available subframes, if the total number of available subframes in a scheduling window is not an integer multiple of P, the remaining number of available subframes is less than P and cannot form a complete transmission window, and the remaining available subframes are no longer used for information transmission.

Wherein, the number of radio frames comprising a PBCH scheduling cycle or a PBCH sub-block cycle is an integer; a PBCH scheduling cycle can also be called a PBCH transmission time interval (TTI) and represents the time interval in which a PBCH encoding block is transmitted; a PBCH sub-block cycle can also be called a PBCH (coded) sub-block interval or a PBCH (coded) sub-block transmission interval and represents the time interval in which a PBCH coded sub-block is transmitted; wherein, a PBCH coded block comprises at least one PBCH coded sub-block, and different PBCH coded sub-blocks use different scrambling sequences.

Step 101: utilize available subframes within the transmission window to transmit information.

Wherein, information transmission comprises sending and receiving information, corresponding to the base station and the terminal device, respectively.

This step specifically comprises: acquiring L transmission windows (such as L transmission windows numbered W0, W1, ..., Wi, WL−1), which are used to transmit information such as SIB1 information, within a K transmission window; wherein, L is equivalent to the number of repeat transmissions of the information in the scheduling window;

Q available subframes are acquired within any transmission window in an L transmission window, and information is transmitted on the acquired Q available subframes; wherein, L is an integer greater than 0 and less than or equal to K, and Q is an integer greater than 1.

Wherein, in the case where a transmission window is cross-continuous P available subframes, the value of P can be set to equal the value of Q. Under these circumstances, there is only one candidate position for a Q available subframe for information transmission within a transmission window.

Furthermore, information transmission on Q available subframes comprises: obtaining the channel coded data of the information based on the number of Q available subframes for information transmission in the transmission window, or on the number of Q available subframes for information transmission in the transmission window and the transmission window sequence number; the obtained channel coded data is then mapped to Q available subframes and transmitted. Wherein, the quantity of channel coded data of the information is equivalent to the quantity of channel coded data that Q available subframes can carry; the channel coded data is sequentially mapped to the Q available subframes according to the number of the radio frame, the subframe, and the orthogonal frequency-division multiplexing (OFDM) symbol; that is, the channel coded data is preferentially mapped to radio frames, sub-frames, and OFDM symbols with sequence numbers at the beginning; under these circumstances, it can be said that the Q available subframes are jointly coded.

Wherein, obtaining channel coded data based on the number of Q available subframes for information transmission within the transmission window and the transmission window sequence number comprises: obtaining the quantity of channel coded data according to the Q available subframes for information transmission within the transmission window, and obtaining the redundancy version (RV) of the channel coded data based on the transmission window sequence number. If at least one channel coded RB is supported by the channel encoder, the specific RV channel coded data selected as the channel coded data of the information within the current transmission window depends on the transmission window sequence number; for example, in the case where 2 RVs are supported, an even-numbered transmission window could select channel coded data from the 1st RB, and an odd-numbered transmission window could select channel coded data from the 2nd RV; wherein, the transmission window sequence number is within the range of L transmission windows of the information transmission (a logical number), which ranges from 0 to (L−1).

Furthermore, the obtainment of L transmission windows that are used to transmit information comprises:

predefining or signaling to indicate the number of L transmission windows for information transmission;

predefining or signaling to indicate the position of L transmission windows; or, determining the position of L transmission windows based on the physical cell identity (PCID). Adopting methods that do not use signaling instructions can simplify the design and/or avoid control signaling expenses; adopting methods that use signaling instructions can increase the flexibility of system design and scheduling.

Wherein, determining the position of L transmission windows for information transmission according to PCID comprises:

assigning all PCID to Type-X according to pre-established rules, wherein, X is an integer greater than 0 and indicates the number of candidate positions of the L transmission windows used for information transmission within the scheduling window; setting PCID type-X to correspond to X candidate positions of L transmission windows used for information transmission with a one-to-one ratio.

Wherein, pre-established rules comprise: assigning PCID with equivalent expression values for the following expressions: mod(PCID, X); or, mod(floor(PCID/Y), X) to the same categories. Wherein, PCID with expression values of 0 are assigned to type-1 PCID, PCID with expression values of 1 are assigned to type-2 PCID, and so on, so that PCID with expression values of X−1 are assigned to type-X PCID; for type-1 PCID, information is transmitted at the 1st candidate position; for type-2 PCID, information is transmitted at the 2nd candidate position, and so on, so that for type-Y PCID, information is transmitted at the Yth candidate position. Wherein, "mod" indicates that the operation takes the remainder, "floor" indicates that the integer operation is rounded downward, and Y is an integer greater than 0 indicating the number of candidate positions of Q available subframes for information transmission in a transmission window.

Or, as an alternative to determining the position of the transmission window based on the PCID, the L transmission window within the scheduling window can be randomly selected according to the PCID, and thus the adjacent transmission window intervals are random. Specifically, different L values can be randomly generated according to the PCID, with values ranging from 0 to K−1, wherein, K represents the number of transmission windows comprising the scheduling windows, and the corresponding L transmission window sequence numbers (equivalent to the transmission window position) can be selected in turn, whereby L transmission windows numbered as above are used as L transmission windows for information transmission. Using the aforementioned method to randomly select L transmission windows within the scheduling window based on the PCID, the position of L transmission windows where different cells transmit information within the scheduling window is random; this facilitates the randomization of interference among cells, thereby reducing interference.

Randomly generating different L values based on PCID comprises: first, a sufficiently long pseudo-random sequence is generated based on the cell PCID; for example, the PCID is used as the initialization value for the pseudo-random sequence generator, wherein, the pseudo-random sequence generator can adopt the methods of the preexisting pseudo-random sequence generator used in the LTE system; secondly, different L values are generated based on the pseudo-random sequence; for example, starting with the first bit of the pseudo-random sequence and sequentially capturing K bit sequences with length D (integers greater than 1; numbering from 0 to K−1), then rearranging the K bit sequences from smallest to largest value (or largest to smallest value), whereupon, after rearranging, the L bit sequence number located at the beginning is used to randomly generate L values based on the PCID. It should be noted that, as a processing mechanism for special cases, if equivalent bit sequences exist in the K bit sequence, the value of the preceding sequence can be predefined to be greater than (or less than) the following sequence value for bit sequences of equal value.

Furthermore, the obtainment within the transmission window of Q available subframes used for information transmission comprises:

predefining or signaling to indicate the number of Q available subframes within the transmission window; predefining or signaling to indicate the position of Q available subframes within the transmission window, or determining the position of Q available subframes within the transmission window according to the PCID and/or the transmission window sequence number.

Utilizing non-signaling instructions simplifies design and/or avoids control signaling expenses.

Wherein, determining the position of Q available subframes, according to PCID and/or transmission window sequence number comprises:

assigning all PCID to type-Y according to the 1st preset rule, wherein, Y is an integer greater than 0 and indicates the number of candidate positions of Q available subframes of information transmission within the transmission window; setting type-Y PCID to correspond to Y candidate positions of Q available subframes for information transmission with a one-to-one ratio;

wherein, the 1st preset rule comprises assigning PCID with equivalent expression values for the following expressions: mod(PCID, Y); or, mod(floor(PCID/X), Y) to the same categories. Wherein, PCID with expression values of 0 are assigned to type-1 PCID, PCID with expression values of 1 are assigned to type-2 PCID, and so on, so that PCID with expression values of (Y−1) are assigned to type-Y PCID; for type-1 PCID, information is transmitted at the 1st candidate position; for type-2 PCID, information is transmitted at the 2nd candidate position, and so on, so that for type-Y PCID information is transmitted at the Yth candidate position. Wherein, "mod" indicates that the operation takes the remainder, "floor" indicates that the integer operation is rounded downward, and X is an integer greater than 0 indicating the number of candidate positions of L duplicate windows for information transmission in a scheduling window.

Or, assigning all NTW transmission window sequence numbers to type-Y according to the 2nd preset rule, and setting type-Y transmission window sequence numbers to correspond to Y candidate positions of Q available subframes of information transmission with a one-to-one ratio; wherein, the 2nd preset rule comprises assigning duplicate window sequence numbers with equivalent expression values for the following expression: mod(NTW, Y) to the same category. Wherein, NTW with expression values of 0 are assigned to type-1 numbering, NTW with expression values of 1 are assigned to type-2 numbering, and so on, so that NTW with expression values of Y−1 are assigned to type-Y numbering; for type-1 numbering, information is transmitted at the 1st candidate position; for type-2 numbering, information is transmitted at the 2nd candidate position, and so on, so that for type-Y numbering information is transmitted at the Yth candidate position. Wherein, "mod" indicates that the operation takes the remainder.

Or, combining all PCID and NTW transmission window sequence numbers and assigning to type-Y according to the 3rd preset rule; setting type-Y transmission window sequence numbers to correspond to Y candidate positions of Q available subframes for information transmission with a one-to-one ratio; wherein, the 3rd preset rule comprises assigning groups of PCID and duplicate window sequence numbers with equivalent expression values for the following expressions: mod(PCID+NTW, Y); or, (floor(PCID/X)+ NTW,Y) to the same categories. Wherein, groupings with expression values of 0 are assigned to type-1 grouping, groupings with expression values of 1 are assigned to type-2 grouping, and so on, so that groupings with expression values of Y−1 are assigned to type-Y grouping; for type-1 grouping, information is transmitted at the 1st candidate position; for type-2 grouping, information is transmitted at the 2nd candidate position, and so on, so that for type-Y grouping information is transmitted at the Yth candidate position. Wherein, "mod" indicates that the operation takes the remainder, "floor" indicates that the integer operation is rounded downward, and X is an integer greater than 0 indicating the number of candidate positions of L duplicate windows for information transmission within the scheduling window.

Or, as an alternative to determining the position of the transmission window based on the PCID and/or the transmission window sequence number, the Q available subframes within the transmission window can be randomly selected based on the PCID and/or the transmission window sequence number, and thus the adjacent available subframe intervals are random; specifically, different Q values can be randomly generated based on PCID and/or the transmission window sequence number, with a possible value range from 0 to (P−1), wherein, P represents the number of subframes comprising a transmission window, corresponding to the Q available subframe number (equivalent to the available subframe positions); the Q available subframes numbered as above are used as the Q available subframes for information transmission in the current transmission window.

By randomly generating Q subframes within the transmission window based on PCID and transmission window sequence number, the positions of Q available subframes where different cells and/or different transmission windows transmit information is random; this facilitates the randomization of interference among cells, and thereby reduces interference.

Randomly generating different Q values based on PCID and/or transmission number comprises: first, a sufficiently long pseudo-random sequence is generated based on the cell PCID and/or the transmission window sequence number; for example, using the PCID, the transmission window sequence number, or a new value determined by the PCID and the transmission window sequence number (such as a value acquired with summation operations), as an initialization value for the pseudo-random sequence generator, wherein, the pseudo-random sequence generator can adopt the methods of the preexisting pseudo-random sequence generator used in the LTE system; secondly, different Q values are generated based on the pseudo-random sequence; for example, starting with the first bit of the pseudo-random sequence and sequentially capturing P bit sequences with length D (integers greater than 1; numbering from 0 to P−1), then rearranging the P bit sequences from smallest to largest value (or largest to smallest value), whereupon, after rearranging, the Q bit sequence number located at the beginning is used to randomly generate Q values based on the PCID and/or transmission window sequence number. It should be noted that, as a processing mechanism for special cases, if equivalent bit sequences exist in the P bit sequences, the value of the preceding sequence can be predefined to be greater than (or less than) the following sequence value for bit sequences of equal value.

Wherein, when the number of L transmission windows for information transmission is instructed by signaling and/or when the number of Q available subframes for information transmission within the transmission window is instructed by signaling, the method for signaling comprises: joint coding of the number of L transmission windows of the information transmission and the transfer block size (TBS); or, joint coding of the number of Q available subframes for transmission of the information in the transmission window and TBS; or, joint coding of the number of L transmission windows of the information transmission and the number of Q available subframes for transmission of information in the transmission window; or, joint coding of the number of transmission windows for information transmission, the number of Q available subframes for information transmission in the transmission window, and TBS of the information. Wherein, joint coding refers to using 1 field to indicate at least 2 items at once; for example, in the case where the number of transmission windows for information transmission, the number of Q available subframes for information transmission in the transmission window, and TBS of the information are jointly coded, it is the case that 1 field indicates the number of transmission windows, the number of Q available subframes, and the TBS value simultaneously.

Figure 3:
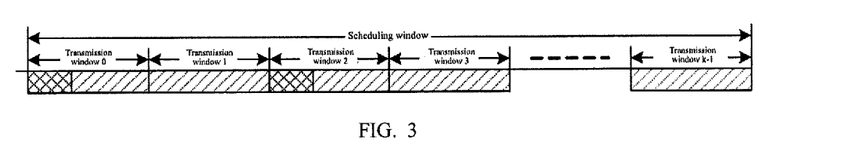
FIG. 3 is a schematic diagram of an intermittent occupancy transmission window, and the continuous occupancy of available subframes within the window.

In this step, L transmission windows that are used within K transmission windows to transmit information are continuous or non-continuous, and Q available subframes that are used within the transmission window to transmit information are continuous or non-continuous. The specific transmission scheme comprises the following four types:

K transmission windows intermittently occupied with L transmission windows and transmission windows continuously occupied by Q available subframes; as FIG. 3 shows, the shaded boxes represent the available subframes continuously occupying the same transmission window, and the transmission windows for information transmission are intermittent.

Figure 4:
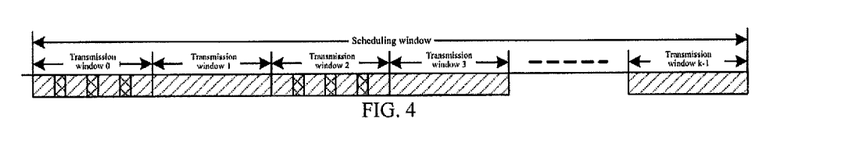
FIG. 4 is a schematic diagram of an intermittent occupancy transmission window, and the intermittent occupancy of available subframes within the window.

K transmission windows intermittently occupied by L transmission windows and transmission windows intermittently occupied by Q available subframes; as FIG. 4 shows, the shaded boxes represent the available subframes intermittently occupying the same transmission window, and the transmission windows for information transmission are intermittent.

Figure 5:
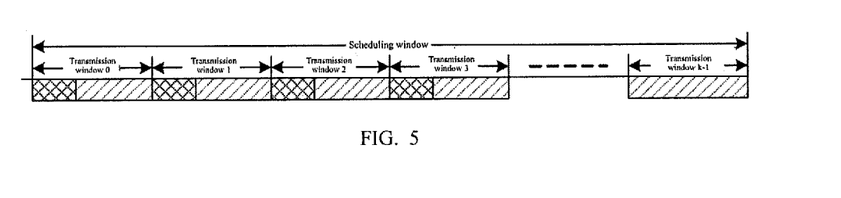
FIG. 5 is a schematic diagram of a continuous occupancy transmission window, and the continuous occupancy of available subframes within the window.

K transmission windows continuously occupied by L transmission windows and transmission windows continuously occupied by Q available subframes; as FIG. 5 shows, the shaded boxes represent the available subframes continuously occupying the same transmission window, and the transmission windows for information transmission are continuous.

Figure 6:
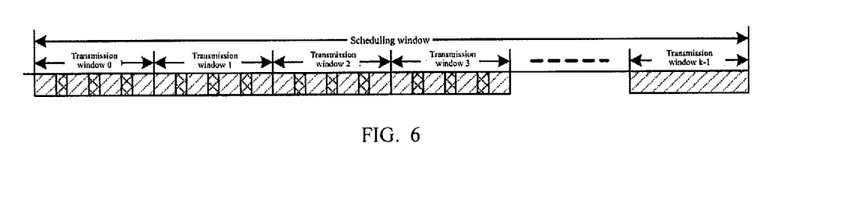
FIG. 6 is a schematic diagram of a continuous occupancy transmission window, and the intermittent occupancy of available subframes within the window

K transmission windows continuously occupied by L transmission windows and transmission windows intermittently occupied by Q available subframes; as FIG. 6 shows, the shaded boxes represent the available subframes intermittently occupying the same transmission window, and the transmission windows for information transmission are continuous.

Furthermore, the candidate positions of L transmission windows for information transmission comprise floor(K/L); the L transmission window corresponding to the jth candidate position is: a continuous L transmission window beginning from the transmission window numbered L·(j−1); or, a non-continuous L transmission window beginning from the transmission window numbered (j−1) and with an adjacent transmission window interval of floor(K/L);

Furthermore, the candidate positions for Q available subframes for information transmission within a transmission window comprise floor(P/Q); the Q available subframe corresponding to the jth candidate position is: a continuous Q available subframe beginning from the available subframe numbered Q·(j−1), or, a non-continuous Q available subframe beginning from the available subframe numbered (j−1) and with an adjacent available subframe interval of floor(P/Q); wherein, j is an integer greater than or equal to 1 and lesser than or equal to floor(P/Q), and "floor" indicates that the integer operation is rounded downward.

By using at least two subframes within the transmission window to transmit data, the technical solutions provided by the present embodiments allow for the channel coding and rate matching of system information, such as SIB1 information, to no longer be restricted to within a single subframe; this technology is especially applicable to system information transmission in systems like NB-IoT, and ensures transmission performance of system information like NB-IoT SIB1 information.

Furthermore, the methods of the present embodiments also comprise:

predefining or signaling to indicate transmission window size and/or scheduling window size.

Adopting methods that do not use signaling instructions can simplify the design and/or avoid control signaling expenses; adopting methods that use signaling instructions can increase the flexibility of system design and scheduling.

Wherein, signaling is used to indicate at least one of the following:

radio frame number, super-frame number, operating mode, reference signal (RS) sequence configuration, RS port number configuration, the frequency offset between different physical channels, base station uplink access capability and downlink control channel configuration. Wherein, a super-frame comprises at least two radio frames. Wherein, the frequency offset between different physical channels is suitable for use with In-band operation, and comprises: the relative frequency offset (e.g., of one or more carriers) between the NB-IoT physical broadcast channel (PBCH) center frequency point and the NB-IoT physical downlink control channel (PDDCH)/the physical downlink shared channel (PDSCH) center frequency point. Wherein, RS sequence configuration is suitable for use with In-band operation, but is considered from a unified design point of view, and non-In-band operation (e.g., Guard band or Standalone operation) can reuse RS sequence configuration parameters under In-band operation; specific RS sequence configuration comprises one of the following: the index of the physical resource block (PRB) of the NB-IoT narrowband; the frequency offset of the NB-IoT narrowband related to the LTE system bandwidth center frequency; wherein, the PRB index indicates the index of the PRB under the maximum LTE system bandwidth configuration (e.g., 110 PRB), and the frequency offset of the narrowband related to the LTE system bandwidth center frequency point indicates the frequency offset (e.g., one or multiple PRB) for the center or edge frequency of NB-IoT narrowband related to the LTE system bandwidth center frequency point.

Wherein, base station uplink access capability comprises, but is not limited to, indicating whether or not the base station can support uplink access methods based on single carrier (Single Tone) and/or multiple carrier (Multi-tone) use and the corresponding carrier bandwidth (e.g., 3.75 kHz or 15 kHz), and downlink control channel configuration, and the downlink control information is not limited to indicating a time frequency resource position of a downlink control channel.

Wherein, operation modes and RS sequence configuration can use joint coding; for example, if the field used to indicate the items is comprised of 2 bits, and only In-band operation requires RS sequence configuration, then it is possible that 00 indicates non-In-band operation, 01 indicates In-band operation and the 1st RS sequence configuration using In-band operation, 10 indicates In-band operation and the 2nd RS sequence configuration using In-band operation, and 11 indicates In-band operation and the 3rd RS sequence configuration using In-band operation.

For In-band operation, when the content of signaling or information comprises RS port number configuration, a physical downlink channel carrying the RS port number configuration and a physical downlink channel received before receiving a physical downlink channel carrying the RS port number configuration are both resource-mapped based on a 4-port RS (the maximum number of ports supported by the LTE system cell-specific RS); it is not necessary to receive other physical downlink channels before receiving the physical downlink channel carrying the RS port number configuration; only the physical downlink channel carrying the number of RS ports is used, based on 4-port RS, for resource mapping; after receiving the physical downlink channel carrying the RS port number configuration, the physical downlink channel implements resource-mapping according to the RS of the RS port number (e.g., 2 or 4) indicated by the RS port number configuration; when the content of signaling instructions or information does not comprise the RS port number configuration, all physical downlink channels implement resource-mapping based on a 4-port RS.

Wherein, the physical downlink channel does not comprise the primary synchronization signal (PSS) or the secondary synchronization signal (SSS); implementing resource mapping based on 2 or 4 port RS means that during the process of resource mapping, the physical downlink channel data does not map onto the resource unit that will transmit the 2 or 4 port RS; in other words, the resource unit that will transmit the 2 or 4 port RS will not carry physical downlink channel data. This method avoids the number of ports that blindly detect RS in the terminal device, and thus reduces the implementation complexity in the terminal device.

With non-In-band operation, information transmission occupies all of the orthogonal frequency-division multiplexed (OFDM) symbol resources within the subframe.

With In-band operation, the first 3 OFDM symbols within the subframe are used on the physical downlink control channel (PDCCH) of the LTE system, and thus cannot be used for other NB-IoT data (comprising information) transmission purposes; but with non-In-band operation, the first 3 OFDM symbols within the subframe can be used to transmit other NB-IoT data; in addition, when the terminal device is receiving data, the operating system of NB-IoT is already known, and all of the OFDM symbols within the subframe can be used to transmit data.

With non-In-band operation, the first 3 OFDM symbols of the PSS/SSS are used for PBCH transmission. The present embodiments, with non-In-band operation, use the OFDM symbols of the 1st PBCH subframe, except for the first 3 OFDM symbols of the 1st PBCH subframe, as the 1st PBCH resource, and use the 1st 3 OFDM symbols of the 2nd PBCH subframe for the 2nd PBCH resource, which improves PBCH transmission performance with non-In-band operation; wherein, the 1 st PBCH subframe is the subframe in which PBCH is transmitted with In-band operation, and the 2nd PBCH subframe comprises the 1st PBCH subframe and the subframe in which PSS/SSS are transmitted.

Within the examples of the present embodiments, transmitted information comprises, but is not limited to, NB-IoT SIB1 messaging, and Paging messaging; signaling comprises, but is not limited to, PBCH signaling.

When the information of the methods of the present embodiments is NB-IoT SIB1 messaging, the contents of SIB1 messaging can comprise all configuration parameters related to the initial access; at this time, the terminal device does not need to receive any system information other than the SIB1 messaging during initial access, which simplifies access flow while avoiding additional power loss in the terminal device, which in turn facilitates power savings.

Furthermore, for different operations such as In-band operation and non-In-band operation, the transmission of SIB1 information can use the same size scheduling window and transmission window; for example, with In-band operation and non-In-band operation, configure the scheduling window to comprise 4 PBCH scheduling cycles and the transmission window to comprise 2 PBCH sub-block cycles; or, because there might be more subframes used for information such as SIB1 message transmission with non-In-band operation (e.g., the FDD system may no longer limited to subframes numbered 0, 4, 5, and 9), the size of the configured scheduling window may not exceed the size of the scheduling window of In-band operation, and the size of the configured transmission window can not exceed the size of the transmission window of In-band operation; for example, with In-band operation, configure the scheduling window to comprise 4 PBCH scheduling cycles and the transmission window to comprise 2 PBCH sub-block cycles, and for non-In-band operation, configure the scheduling window to comprise 2 PBCH scheduling cycles and the transmission window to comprise 1 PBCH sub-block cycle.

The methods of the present invention will now be described in detail with reference to specific embodiments.

The first embodiment gives the preferred values for scheduling window size, transmission window size, and Q available subframes for information transmission within the transmission window. For the first embodiment, supposing the PBCH sub-block cycle is 8 radio frames and the PBCH scheduling cycle is 64 radio frames (i.e., 1 PBCH scheduling cycle comprises 8 PBCH subframe cycles), then the preferred value for the transmission window size comprises: 8, 16, or 32 radio frames (i.e., 1, 2, and 4 multiples of PBCH sub-block cycles); additionally, the ideal value for the scheduling window size comprises: 64, 128, 256, or 512 radio frames (i.e., 1, 2, 4, and 8 multiples of PBCH scheduling cycles). Table 1 shows a combination of preferred values for transmission window size and scheduling window size, and the number of K transmission windows comprising one corresponding scheduling window.

TABLE 1

| Sequence number | Transmission window size unit: PBCH sub-block cycle | Scheduling window size unit: PBCH scheduling cycle | Number of K transmission windows comprising a scheduling window |
|---|---|---|---|
| 0 | 1 | 1 | 8 |
| 1 | 1 | 2 | 16 |
| 2 | 1 | 4 | 32 |
| 3 | 1 | 8 | 64 |
| 4 | 2 | 1 | 4 |
| 5 | 2 | 2 | 8 |
| 6 | 2 | 4 | 16 |
| 7 | 2 | 8 | 32 |
| 8 | 4 | 1 | 2 |
| 9 | 4 | 2 | 4 |
| 10 | 4 | 4 | 8 |
| 11 | 4 | 8 | 16 |

The number of Q available subframes for information transmission within a transmission window is typically only related to TBS, and does not rely on the size of either the scheduling window or the transmission window. With different size configurations for transmission windows and scheduling windows, the ideal number of Q available subframes comprises: 4, 6, or 8 subframes.

The second embodiment gives the method for determining the scheduling window size and the transmission window size.

Wherein, to simplify the design, the size of the scheduling window and the transmission window can be configured to be a set value; or, the size of the scheduling window can be configured to be a set value, and the size of the transmission window can be set to be configurable; or, the size of the scheduling window can be set to be configurable, and the size of the transmission window can be set to be configurable. Wherein, Table 2 shows an example of a field (2 bits) that jointly indicates the size of the scheduling window and the size of the transmission window when the sizes are set to be configurable.

TABLE 2

| Sequence number | Scheduling window size unit: PBCH scheduling cycle | Transmission window size unit: PBCH sub-block cycle |
|---|---|---|
| 0 | 1 | 1 |
| 1 | 2 | 1 |
| 2 | 4 | 2 |
| 3 | 8 | 2 |

The third embodiment gives an example of encoding the number of L transmission windows for information transmission within a scheduling window, information TBS, and the number of Q available subframes for information transmission within one transmission window when the number of L transmission windows and the number of Q available subframes are indicated by signaling. Suppose the size of the scheduling window and transmission window are as shown in Table 1, configuration 6, and the value for information TBS is 6, as shown in Table 3, wherein, the field for TBS indication, the number of L transmission windows within the scheduling window, and the Q available subframes within the transmission window comprises 5 bits.

TABLE 3

| Sequence number | TBS | Number of Q subframes within a transmission window | Number of L transmission windows within a scheduling window |
| --- | --- | --- | --- |
| 0 | TBS 1 | 4 | 4 |
| 1 | TBS 1 | 4 | 8 |
| 2 | TBS 1 | 4 | 16 |
| 3 | TBS 2 | 4 | 4 |
| 4 | TBS 2 | 4 | 8 |
| 5 | TBS 2 | 4 | 16 |
| 6 | TBS 3 | 6 | 4 |
| 7 | TBS 3 | 6 | 8 |
| 8 | TBS 3 | 6 | 16 |
| 9 | TBS 4 | 6 | 4 |
| 10 | TBS 4 | 6 | 8 |
| 11 | TBS 4 | 6 | 16 |
| 12 | TBS 5 | 8 | 4 |
| 13 | TBS 5 | 8 | 8 |
| 14 | TBS 5 | 8 | 16 |
| 15 | TBS 6 | 8 | 4 |
| 16 | TBS 6 | 8 | 8 |
| 17 | TBS 6 | 8 | 16 |
| 18-31 | N/A | N/A | N/A |

It should be noted that, for further simplification, the number of Q available subframes within the transmission window can be limited to the set value of 6 subframes, which at this time is equivalent to the joint coding of the information TBS parameter and the number of L transmission windows within the scheduling window parameter.

The fourth embodiment gives a specific example for determining L transmission window position within a scheduling window that comprises K transmission windows:

One method is the predefining method; for example, supposing that 1 scheduling window comprises 16 (K) transmission windows, and that the possible values for the number of (L) transmission windows within a scheduling window are 4 and 8; the specific utilization method is to configure a fixed mapping between the number of transmission windows within the scheduling window and the transmission window sequence number (equivalent to the position of the transmission window), as is shown in FIG. 4 below.

TABLE 4

| Number of L transmission windows in the scheduling window | Numbering of L transmission windows in the scheduling window |
| --- | --- |
| 4 | 0, 4, 8, 12 |
| 8 | 0, 2, 4, 6, 8, 10, 12 |

Wherein, the transmission window sequence number of the information transmission comprises numbering (physical number) within the range of the 16 transmission windows comprising the scheduling window, with values ranging from 0 to 15. Using the predefined method a shown in FIG. 4, the transmission window position within a scheduling window is not related to cell PCID, and different cells always occupy the same transmission window (i.e., the transmission windows occupied by different cells completely overlap).

Another method is determining the position of L transmission windows of information transmission based on PCID:

For example, suppose a scheduling window comprises 8 (K) transmission windows, and 4 (L) transmission windows are used within a scheduling window to transmit information; at this time, the candidate positions of the 4 transmission windows used to transmit information within a scheduling window altogether comprise 2 (X=K/L).

Figure 7A:
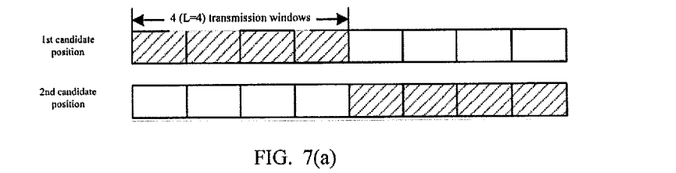
FIG. 7(a) is a schematic diagram of an example of candidate transmission window positions of the present embodiments.
Figure 7B:
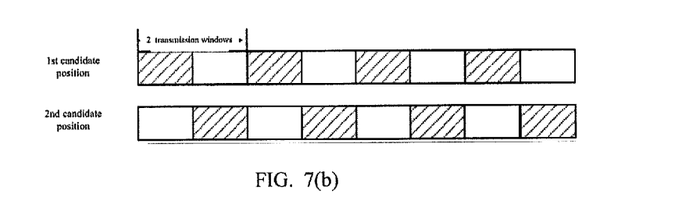
FIG. 7(b) is a schematic diagram of a different example of candidate transmission window positions of the present embodiments.

Wherein, the 4 transmission windows corresponding to a candidate position could be 4 continuous transmission windows, as is shown by the diagonal shading in FIG. 7(a); or, the transmission windows could be 4 non-continuous transmission windows, such as with 2 intermittent transmission windows appearing intermittently, as is shown by the diagonal shading in FIG. 7(b).

Figure 8:
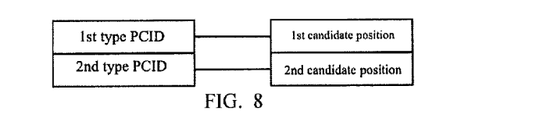
FIG. 8 is a schematic diagram of the correspondence between different types of PCID and candidate transmission window positions of the present embodiments.

Specific operations comprise:

according to the following expressions: mod(PCID, 2); or, mod(floor(PCID/Y), 2), assign all PCID to two types, wherein, Y indicates the number of candidate positions of available subframes for information transmission within a transmission window (e.g., a value of 3); assign PCID with expression values of 0 to type-1 (i.e., type-1 PCID is equivalent to even-numbered PCID), and assign PCID with expression values of 1 to type-2 PCID (i.e., type-2 PCID is equivalent to odd-numbered PCID); even-numbered and odd-numbered PCID are distinguished from each other, and a one-to-one correspondence is established between candidate positions of the two types, as is shown in FIG. 8; that is, for even-numbered PCID, information is transmitted at the 1st candidate position, and for odd-numbered PCID, information is transmitted at the 2nd candidate position.

The fifth embodiment gives a specific example of how to determine the Q available subframe candidate positions of information transmission within a transmission window that comprises P subframes:

One method is the predefining method; for example, suppose a transmission window comprises 16 (P) available subframes, and the possible values for the number of (Q) available subframes for information transmission within a transmission window are 4, 6, and 8; the specific utilization method is to configure a fixed mapping between the number of available subframes within the transmission window and the available subframe sequence number (equivalent to the position of the available subframe), as is shown in FIG. 5 below.

TABLE 5

| Number of Q available subframes in the transmission window | Numbering of available subframes |
| --- | --- |
| 4 | 0, 4, 8, 12 |
| 6 | 0, 3, 6, 9, 12, 15 |
| 8 | 0, 2, 4, 6, 8, 10, 12, 14 |

Utilizing the predefining method as shown in FIG. 5, the position of available subframes within a transmission window is not related to PCID or the transmission window sequence number; that is, for different cells and/or different transmission windows, the available subframes for information transmission are always the same, which facilitates design simplification.

Another method is determining the position of Q available subframes for information transmission within a transmission window based on cell PCID and/or the transmission window sequence number: for example, suppose a transmission window comprises 18 (P) available subframes and 6 (Q) available subframes are used within a transmission window to transmit data; at this time, the candidate positions for the 6 transmission windows that are used to transmit information altogether comprise 3 (Y=P/Q).

Figure 9A:
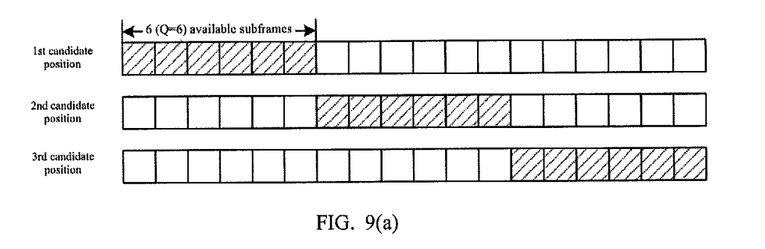
FIG. 9(a) is a schematic diagram of an example of candidate subframe positions of the present embodiments.
Figure 9B:
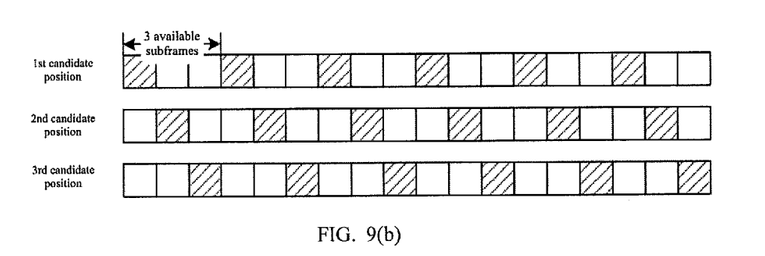
FIG. 9(b) is a schematic diagram of a different example of candidate subframe positions of the present embodiments.

Wherein, the 6 available subframes corresponding to a candidate position can be 6 continuous available subframes, as the diagonal shading in FIG. 9(a) shows; or, the available subframes can be 6 non-continuous subframes, such as with 3 intermittent available subframes appearing intermittently, as is shown by the diagonal shading in FIG. 9(b).

Figure 10:
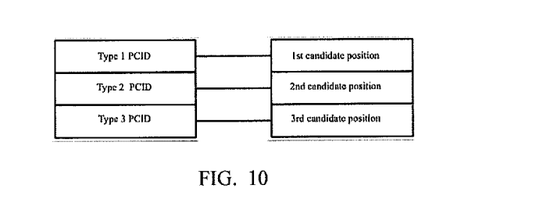
FIG. 10 is a schematic diagram of the correspondence between different types of PCID and candidate subframe positions of the present embodiments.

Specific operations comprise:

according to the following expressions: mod(PCID, 3); or, mod(floor(PCID/X), 3), separate all PCID into three types, wherein, X represents the number of candidate positions (e.g., a value of 2) of the transmission window for information transmission in a scheduling window; assign PCID with expression values of 0 to type-1, PCID with expression values of 1 to type-2 PCID, and PCID with expression values of 2 to type-3 PCID; the 3 types are distinguished from each other, and there is a one-to-one correspondence between the 3 candidate positions, as is shown in FIG. 10; that is, for type-1 PCID, information is transmitted at the 1st candidate position, for type-2 PCID, information is transmitted at the 2nd candidate position, and for type-3 PCID, information is transmitted at the 3rd candidate position.

Figure 11:
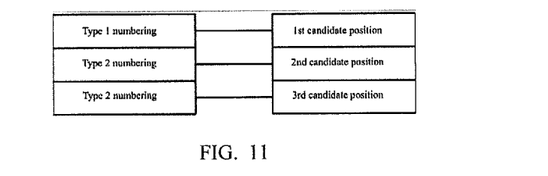
FIG. 11 is a schematic diagram of the correspondence between different types of transmission window numbering and candidate subframe positions of the present embodiments.

Or, according to the following expression: mod(NTW, 3), separate all NTW sequence numbers (e.g., if the number of L transmission windows for information transmission within a scheduling window is 8, then the range of NTW values is 0 to 7) into 3 types; assign NTW with expression values of 0 to type-1 numbering, NTW with expression values of 1 to type-2 numbering, and NTW with expression values of 2 to type-3 numbering; the 3 types are distinguished from each other, and there is a one-to-one correspondence between the 3 candidate positions, as is shown in FIG. 11; that is, for type-1 NTW, information is transmitted at the 1st candidate position, for type-2 NTW, information is transmitted at the 2nd candidate position, and for type-3 NTW, information is transmitted at the 3rd candidate position.

Figure 12:
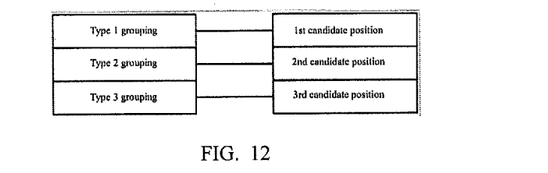
FIG. 12 is a schematic diagram of the correspondence between different types of PCID, transmission window sequence number grouping, and candidate subframe positions of the present embodiments.

Or, according to the following expressions: mod(PCID+NTW, 3); or, mod(floor(PCID/X)+NTW, 3), assign different groups of PCID and NTW transmission window sequence numbers (e.g., if the number of L transmission windows for information transmission within a scheduling window is 8, then the range of NTW values is 0 to 7) to one of 3 types. Wherein, X represents the number of candidate positions (e.g., a value of 2) of a transmission window for information transmission within a scheduling window; assign groups with expression values of 0 to type-1 grouping, groups with expression values of 1 to type-2 grouping, and groups with expression values of 2 to type-3 grouping; the 3 types are distinguished from each other, and there is a one-to-one correspondence between the three candidate positions, as is shown in FIG. 12; that is, for type-1 groupings information is transmitted at the 1st candidate position, for type-2 groupings information is transmitted at the 2nd candidate position, and for type-3 groupings information is transmitted at the 3rd candidate position.

The sixth embodiment gives an example of the 2nd PBCH resource with non-In-band operation.

Figure 13:
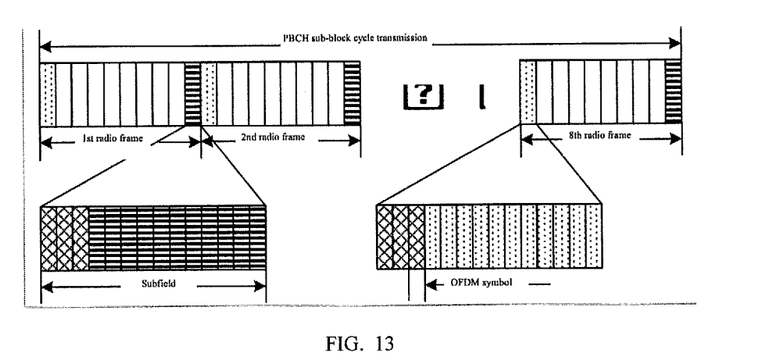
FIG. 13 is a schematic diagram of the 2nd PBCH resource with non-In-band operation of the present embodiments.

Using 1 PBCH sub-block cycle (comprising 8 radio frames) as an example, FIG. 13 is a schematic diagram of the 2nd PBCH resource with non-In-band operation of the present embodiments; as is shown in FIG. 13, OFDM symbols in every radio frame's final subframe comprise OFDM symbols other than the first 3 OFDM symbols and are used as PSS/SSS resources, as the horizontal line shadows in FIG. 13 show; the OFDM symbol resources allocated to PBCH sub-blocks comprise two parts: the 1st part can be called the 1st PBCH resource, as the snowflake-dotted shadows of FIG. 13 show (i.e., the OFDM symbol resources, excluding the first 3 OFDM symbols, in the 1st subframe (the 1st PBCH subframe) of every radio frame); the 2nd part can be called the 2nd PBCH resource, as the slanted box shadows in FIG. 13 show, which comprises the first 3 OFDM symbols within the PSS/SSS subframe (the last subframe of every radio frame) and the 1st PBCH subframe.

For the PBCH transmission on the 2nd PBCH resource, the transmitted PBCH channel coded data is generated based on the quantity of 2nd PBCH resources (i.e., 3 OFDM symbols) within one 2nd PBCH subframe (the first and last subframe in every radio frame); the generated PBCH channel coded data is equivalent to the amount of PBCH channel coded data the 2nd PBCH resource can carry within one 2nd PBCH subframe; the modulated PBCH channel code data is sequentially mapped to 3 OFDM symbol resources used as the 2nd PBCH resource of every 2nd PBCH subframe within 1 PBCH sub-block cycle according to the OFDM symbol sequence number; that is, 16 repeat transmissions on the 2nd PBCH resource of the 16 2nd PBCH subframes within 1 PBCH sub-block cycle.

Figure 14:
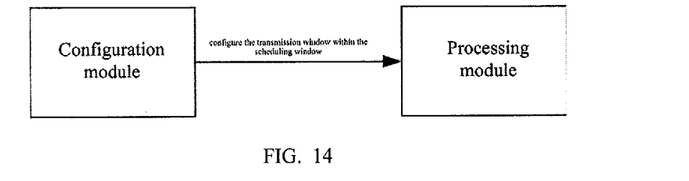
FIG. 14 is a schematic diagram of the composition structure of the system information transmission apparatus of the present embodiments.

FIG. 14 is a schematic diagram of the structure of the system information transmission apparatus of the present embodiments, which comprises at least a configuration module and a processing module; wherein, a configuration module, which is configured to set up the transmission window within the scheduling window; wherein, a scheduling window comprises K transmission windows, a transmission window comprises P available subframes, K is an integer greater than 0, and P is an integer greater than 1; a processing module, which is configured to utilize available subframes in the transmission window to transmit information; wherein, a scheduling window comprises N1 PBCH scheduling cycles or comprises N2 PBCH sub-block cycles; a transmission window comprises PBCH sub-block cycles or M PBCH sub-block cycles; or comprises P available subframes that are cross continuous; wherein, N1, N2, and M are all integers greater than 0; every PBCH scheduling cycle comprises at least one PBCH sub-block cycle.

The processing module of the apparatus of the present embodiments is specifically configured as follows: acquiring L transmission windows (such as L transmission windows numbered W0, W1, . . . , Wi, WL−1), which are used to transmit information such as SIB1 information, within a K transmission window; for any transmission window within an L transmission window, Q available subframes for the transmission of information are obtained, and information is transmitted on the acquired Q subframes; wherein, L is an integer greater than 0 and less than or equal to K, and Q is an integer greater than 1.

Wherein, transmitting information on the acquired Q available subframes comprises: obtaining channel coded data of the information based on the number of Q available subframes for information transmission within the transmission window or based on the number of Q available subframes for information transmission within the transmission window and the transmission window sequence number; mapping the acquired channel coding information of the information onto Q available subframes and transmitting.

What has been described here are only the optimal embodiments of the present invention, and are not meant to limit its claims. The present invention could undergo any number of alterations or changes. Any and all modifications, equivalent substitutions, improvements, etc., which are within the spirit and principles of the present invention, should be included within the scope of the present embodiments.

INDUSTRIAL APPLICABILITY

The technical solutions provided by the present embodiments can be applied to the process of information transmission by configuring a transmission window within a scheduling window; wherein, a scheduling window comprises K transmission windows, a transmission window contains P available subframes, K is an integer greater than 0, and P is an integer greater than 1; transmitting information on available subframes within the transmission window. By using at least two subframes within the transmission window to transmit data, the technical solutions provided by the present embodiments allow for the channel coding and rate matching of system information, such as SIB1 information, to no longer be restricted to within a single subframe; this technology is especially applicable to system information transmission in systems such as NB-IoT, and ensures transmission performance of system information such as NB-IoT SIB1 information.

What is claimed is:

1. A method performed by a wireless communication node, comprising:
    configuring a scheduling window into K transmission windows of a narrow-band Internet of Things (NB-IoT) system, wherein each of the K transmission windows comprises a plurality of subframes of the NB-IoT system;
    determining L transmission windows from the K transmission windows;
    determining Q subframes from the L transmission windows; and
    using the Q subframes to broadcast a first system information broadcast (SIB1) message, wherein L is an integer greater than 0 and less than or equal to K, and K and Q are each integers greater than 1, and wherein the scheduling window comprises N1 physical broadcast channel (PBCH) scheduling cycles of the NB-IoT system and the transmission window comprises M PBCH sub-block cycles of the NB-IoT system, wherein N1 and M are positive integers.

2. The method of claim 1, wherein each of the Q subframes used to broadcast the SIB1 message belongs to a set of subframes remaining after transmission of a primary synchronization signal (PSS), a secondary synchronization signal (SSS) and a PBCH subframe in a specified set of subframes, wherein the specified set of subframes for a frequency duplex division (FDD) system comprises all subframes numbered 0, 4, 5, and 9.

3. The method of claim 1, further comprising identifying respective locations of the L transmission windows through a Physical Cell Identity (PCID).

4. The method of claim 1, wherein when operating under a non-in-band mode, all Orthogonal Frequency-Division Multiplexed (OFDM) symbols of the Q subframes are used to transmit information.

5. The method of claim 1, wherein when operating under a non-in-band mode, a size of the scheduling window does not exceed the size of a scheduling window when operating under an in-band mode, and a size of the transmission window does not exceed the size of a transmission window when operating under an in-band mode.

6. The method of claim 1, wherein the number of candidate positions for L transmission windows is floor (K/L), and the L transmission windows corresponding to the jth candidate position begins from the transmission window numbered (j−1) and with an adjacent transmission window interval of floor(K/L), wherein j is an integer greater than or equal to 1 and less than or equal to floor(K/L), and "floor" indicates that an integer operation is rounded downward, and K is the total number of available transmission windows that are candidates for the L transmission windows.

7. The method of claim 1, wherein the number of candidate positions of the Q subframes in the transmission window is floor(P/Q); the Q available subframe corresponding to the the jth candidate position begins from the available subframe numbered (j−1) and with an adjacent available subframe interval of floor(P/Q); wherein, j is an integer greater than or equal to 1 and less than or equal to floor(P/Q), and "floor" indicates that an integer operation is rounded downward, and P is the total number of available subframes that are candidates for the Q subframes.

8. A non-transitory computer-readable medium having stored thereon computer-executable instructions for carrying out any one of claims 1 through 7.

9. A system information transmission apparatus, comprising at least one processor, wherein the at least one processor is configured to:
    configure a scheduling window into K transmission windows of a narrow-band Internet of Things (NB-IoT) system, wherein each of the K transmission windows comprises a plurality of subframes of the NB-IoT system;
    determine L transmission windows from the K transmission windows;
    determine Q subframes from the L transmission windows; and
    use the Q subframes to broadcast a first system information broadcast (SIB1) message, wherein L is an integer greater than 0 and less than or equal to K, and K and Q are each integers greater than 1, and wherein the scheduling window comprises N1 physical broadcast channel (PBCH) scheduling cycles of the NB-IoT system and the transmission window comprises M PBCH sub-block cycles of the NB-IoT system, wherein N1 and M are positive integers.

10. The system information transmission apparatus of claim 9, wherein each of the Q subframes used to broadcast the SIB1 message belongs to a set of subframes remaining after transmission of a primary synchronization signal (PSS), a secondary synchronization signal (SSS) and a PBCH subframe in a specified set of subframes, wherein the specified set of subframes for a frequency duplex division (FDD) system comprises all subframes numbered 0, 4, 5, and 9.

11. The system information transmission apparatus of claim 9, wherein the at least one processor is further configured to identify respective locations of the L transmission windows through a Physical Cell Identity (PCID).

12. The system information transmission apparatus of claim 9, wherein when operating under a non-in-band mode, all Orthogonal Frequency-Division Multiplexed (OFDM) symbols of the Q subframes are used to transmit information.

13. The system information transmission apparatus of claim 9, wherein when operating under a non-in-band mode, a size of the scheduling window does not exceed the size of a scheduling window when operating under an in-band mode, and a size of the transmission window does not exceed the size of a transmission window when operating under an in-band mode.

* * * * *